United States Patent
Jiang et al.

(10) Patent No.: US 12,443,452 B2
(45) Date of Patent: Oct. 14, 2025

(54) CROSS-DOMAIN CABIN COMPUTING SYSTEM AND METHOD BASED ON DATA RESOURCE DISTRIBUTION

(71) Applicant: TONGJI UNIVERSITY, Shanghai (CN)

(72) Inventors: Changjun Jiang, Shanghai (CN); Jian Yu, Shanghai (CN); Zhijun Ding, Shanghai (CN); Zhaohui Zhang, Shanghai (CN); Chungang Yan, Shanghai (CN); Yaying Zhang, Shanghai (CN); Pengwei Wang, Shanghai (CN); Youqun Shi, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 358 days.

(21) Appl. No.: 17/921,639

(22) PCT Filed: Aug. 31, 2020

(86) PCT No.: PCT/CN2020/112393
§ 371 (c)(1),
(2) Date: Oct. 27, 2022

(87) PCT Pub. No.: WO2021/232610
PCT Pub. Date: Nov. 25, 2021

(65) Prior Publication Data
US 2023/0176913 A1   Jun. 8, 2023

(30) Foreign Application Priority Data

May 21, 2020   (CN) .......................... 202010436180.3

(51) Int. Cl.
*G06F 3/00*     (2006.01)
*G06F 9/50*     (2006.01)
*G06F 9/54*     (2006.01)

(52) U.S. Cl.
CPC .............. *G06F 9/5033* (2013.01); *G06F 9/54* (2013.01)

(58) Field of Classification Search
CPC ....................................................... G06F 9/50
See application file for complete search history.

(56) References Cited

U.S. PATENT DOCUMENTS 6,523,065 B1 * 2/2003 Combs .................... H04L 67/51
                                                                709/201
6,826,624 B1 * 11/2004 Fell, Jr. ................... H04L 67/63
                                                              707/E17.115

(Continued)

FOREIGN PATENT DOCUMENTS

AU   2003254238 A1 * 2/2004   ............. H04L 63/10
CA      3095029 A1 * 8/2021   ............. G06N 3/045

(Continued)

OTHER PUBLICATIONS

Katia Obraczka, Internet Resource Discovery Services . (Year: 1993).*

(Continued)

*Primary Examiner* — Lechi Truong
(74) *Attorney, Agent, or Firm* — IPRTOP LLC (57) ABSTRACT

A cross-domain cabin computing system and a cross-domain cabin computing method based on data resource distribution are provided, including: a cabin generation and management system obtains a data resource distribution map from a virtual data center system according to a cabin data and resource request, obtains a cross-domain resource directory from a cross-domain resource management system, and calculates a list of resource requirements of cabins; the (Continued)

cross-domain resource management system sends a resource request to a public cloud or a non-cloud resource to which resources belong based on the list of resource requirement of the cabins, and send information signaling that the resource request is successful to the cabin generation and management system to enable the cabin users to establish cabins based on cross-domain resources and data resources corresponding to the data resource distribution map, thereby realizing cabin computing.

19 Claims, 7 Drawing Sheets

(56) References Cited

U.S. PATENT DOCUMENTS

| | | | | |
|---|---|---|---|---|
| 7,463,648 | B1 * | 12/2008 | Eppstein | G06F 9/5011 |
| | | | | 709/227 |
| 7,610,378 | B2 * | 10/2009 | Teodosiu | H04L 67/104 |
| | | | | 709/227 |
| 7,668,939 | B2 * | 2/2010 | Encarnacion | H04N 21/6587 |
| | | | | 709/221 |
| 9,674,275 | B1 * | 6/2017 | Engers | G06F 16/168 |
| 2002/0091745 | A1 * | 7/2002 | Ramamurthy | H04L 9/40 |
| | | | | 707/E17.112 |
| 2019/0230167 | A1 * | 7/2019 | Laari | H04L 41/12 |

FOREIGN PATENT DOCUMENTS

| | | |
|---|---|---|
| CN | 104461740 A | 3/2015 |
| CN | 107967175 A | 4/2018 |
| CN | 110266744 A | 9/2019 |
| CN | 110781430 A | 2/2020 |
| EP | 2961134 A1 | 12/2015 |

OTHER PUBLICATIONS

Michael F. Schwartz, A Comparison of Internet Resource Discovery Approaches. (Year: 1992).*

* cited by examiner

CROSS-DOMAIN CABIN COMPUTING SYSTEM AND METHOD BASED ON DATA RESOURCE DISTRIBUTION

TECHNICAL FIELD

The present disclosure relates to the field of dynamic allocation of cross-domain digital resources, and in particular, to a cross-domain cabin computing system and a cross-domain cabin computing method based on data resource distribution.

BACKGROUND

Information technology is an important driving force for economic and social development in today's world, and it also promotes the transformation, optimization, and upgrading of the global industrial structure, and brings about profound changes in human production and lifestyle. The rapid development of new technologies in areas such as communication and network, has greatly expanded the development space of the information service industry and brings new development opportunities. New applications are emerging and new business models are flourishing. At the same time, the diversity of demand and the variability of the business environment have put forward high requirements for information service technology.

First of all, applications are becoming more and more complex, they need to deal with changing demands and support more users, they need more computing power, and they need to be more stable and secure. In order to support these growing demands, application providers have to invest more manpower, material resources, and financial resources to support the operation and maintenance of all kinds of hardware devices (servers, storage, bandwidth, etc.) and software (database, middleware, etc.).

Second, the rapid growth of smart connected devices, digital services and cloud applications is driving explosive growth in data. The growth in data volume and technological innovations are bringing in new experiences in various aspects such as smart cities, unmanned driving, precision medicine, and immersive games, which are changing our lives. Although Big Data contains almost all the information we need, it has become a recognized challenge to efficiently acquire and process so much dynamic data as it has greatly exceeded human perception in terms of quantity, type, and dynamic characteristics.

Finally, as information products and resources are getting more and more abundant, it is possible and also necessary to optimize the allocation of resources. Currently, there exist many ways of using resources, and a better one among them needs to be chosen in order to achieve the highest efficiency of resource utilization and to realize the maximum satisfaction of consumers, enterprises and social interests.

The continuous development of information technology also aims to address the major issues and challenges mentioned above. In particular, the emergence and popularity of computer networks and the Internet have led to the emergence of a new network structure called "Grid". A Grid is an infrastructural facility that integrates geographically dispersed resources. With the Grid, users can use resources they need without knowing the specific details of the resources on the Grid. Resource sharing is a fundamental feature of the Grid, and eliminating resource silos is the ultimate goal of the Grid. Currently, research on the Grid focuses on the following five aspects: grid architecture, management of grid resources, task management, security issues of the grid, and related communication technologies.

The emergence of the Grid makes better use of decentralized computing resources and provides higher scalability. In order to protect shared information and to achieve effective sharing of specific resources, a virtual organization was proposed on the basis of the Grid. The virtual organization is a collection of individuals and autonomous domains formed according to certain rules of resource sharing, where autonomous domains or individuals share resources and solve problems through virtual organizations. Virtual organizations require users to share their resources, and users within the same virtual organization can both provide and use resources. Since virtual organizations are built on the basis of the Grid, execution tasks submitted by users of the virtual organizations need to be scheduled by a grid center. Research on virtual organizations focuses on: virtual organizations considering priorities, virtualization among virtual organizations, construction and management of virtual organizations, and business collaboration across virtual organizations.

Consistent resource sharing and usage rules in virtual organizations improve the utilization of resources, its essence is to achieve a more granular management of resources, and the goal is to achieve the sharing and exchanging of resources and information within a certain group. Although virtual organizations achieve stronger information sharing, they lack versatility in resource usage, while cloud computing platforms provide unified platforms for resource usage. The term "cloud computing" may be used to describe either a system platform or a type of application. When it is a system platform, the term "cloud computing" may describe a physical server or a virtual server; when it is an application, the term "cloud computing" may describe a scalable application that can be accessed via the Internet. In this Internet era that is racing ahead, almost all applications use cloud computing, and Cloud has become an indispensable part of life. Currently, there has been a great deal of research on cloud computing, which focuses on the following six aspects: task scheduling, resource management, software testing, cloud simulation and emulation, network security, and cost optimization of cloud resource usage.

The emergence of cloud computing reduces costs of using computing resources and software, and provides an on-demand resource usage model, and it also has high availability and scalability. However, although the existing cloud computing has become the mainstream computing model, it also has various shortcomings; for example, it is not adequately real-time, which is not conducive to data security and privacy, etc. In order to protect user data and respond to users' needs in real time, edge computing was proposed. Edge computing is a computing model that integrates core capabilities of network, computing, storage, and application on an edge side of the network near objects or sources of data, and provides intelligent services at the edge side on the spot. one goal pursued by edge computing is faster response. Main research elements of edge computing include computing offloading and mobility management. Computing offloading refers to the offloading of some or all computational tasks from terminal devices to resource-rich edge servers to address shortcomings of terminal devices in terms of resource storage, computational performance, and energy efficiency. Mobility management refers to supporting the mobility of applications by utilizing the fact that resources are widely distributed geographically, and an edge computing node serves only its surrounding users.

Edge computing has plenty of advantages over cloud computing; for example, a large amount of temporary data is processed at the edge side of the network and only part of the temporary data is loaded to the cloud, which reduces the risk of network leakage, and a faster response can also be obtained since most data processing is conducted close to data producers. At the same time, edge computing also has the obvious drawback of limited computing resources, which makes edge computing unable to undertake a large number of data computing tasks. Inspired by edge computing, researchers proposed using multiple different cloud centers to handle user requests, so that sufficient computing power could be ensured and cloud resources could be obtained nearby. Multi-cloud is a model which meets the above demands. Multi-cloud refers to using multiple cloud computing and storage services organized in a single network architecture, wherein the multiple cloud computing and storage services are from global cloud computing providers, such as AWS, Azure, and Google. Multi-cloud typically has multiple identity infrastructures for different environments, and is able to mix delivery mechanisms from SaaS, IaaS and PaaS. Multi-cloud also supports multiple cloud storage services independent of the APIs and interfaces used to access these services, as well as a scalable data workflow engine that can efficiently support full data life cycle management capabilities. Currently, research on multi-cloud focuses on: time-bound workflow scheduling, cross-cloud application deployment, virtualization of multi-cloud environments, system management between multiple clouds, and data storage between multiple clouds. The use of multi-cloud increases the flexibility and reliability of applications, thereby breaking software suppliers' stranglehold. However, in a multi-cloud environment, business operations are complex, and the prices and fault tolerance of multiple supplies need to be considered at the same time, which increases management costs.

SUMMARY

The present disclosure provides a cross-domain cabin computing system based on data resource distribution.

The cross-domain cabin computing system includes a cabin generation and management system, a virtual data center system, and a cross-domain resource management system. The cabin generation and management system is used to send a request for a data resource distribution map to the virtual data center system and is used to send a request for a cross-domain resource directory to the cross-domain resource management system based on a cabin-data-and-resource request sent by cabin users, and is used to calculate a list of resource requirements for cabins based on the data resource distribution map provided by the virtual data center system and the cross-domain resource directory provided by the cross-domain resource management system. The virtual data center system is connected to the cabin generation and management system, and is used to provide the data resource distribution map based on the request for the data resource distribution map. The cross-domain resource management system is connected to the cabin generation and management system, and is used to send a resource request to a public cloud or a non-cloud resource to which resources belong, based on the list of resource requirements of the cabins, and send information signaling that the resource request is successful to the cabin generation and management system to enable the cabin users to establish cabins based on cross-domain resources and data resources corresponding to the data resource distribution map, thereby realizing cabin computing.

In an embodiment, the cabin generation and management system includes a user requirement management module, a data resource distribution map acquisition module, a cross-domain resource directory acquisition module, and a cross-domain resource scheduling module; the user requirement management module is used to receive the cabin data and resource request; the data resource distribution map acquisition module is used to access the virtual data center system, and is used to obtain the data resource distribution map based on the cabin data and resource request; the cross-domain resource directory acquisition module is used to access the cross-domain resource management system to obtain the cross-domain resource directory; and the cross-domain resource scheduling module is used to calculate the list of resource requirements based on the cabin data and resource request, the data resource distribution map and the cross-domain resource directory.

In an embodiment, the virtual data center system includes a network data explorer, an exploration sampling database, a data resource distribution map manager, a data resource distribution map, and a data resource distribution map service module; the network data explorer is used to explore network big data and data from protocol data providers to generate the data resource distribution map, and is used to place exploration samples into the exploration sampling database; the exploration sampling database isused to save the exploration samples obtained by the network data explorer; the data resource distribution map manager is used to maintain data of the data resource distribution map; the data resource distribution map is used to save distribution information of data resources; and the data resource distribution map service module is used to provide an access service for the data resource distribution map data.

In an embodiment, the cross-domain resource management system includes a resource registration service module, a resource status update module, a resource directory manager, a cross-domain resource directory, a cross-domain resource directory service module, a cabin resource request service module, and a cabin resource request or revocation module; the resource registration service module is used to provide a resource registration service for external resource providers; the resource status update module is used to update resource status of the external resource providers; the resource directory manager is used to manage the cross-domain resource directory; the cross-domain resource directory is used to store a list of cross-domain resources; the cross-domain resource directory service module is used to provide a resource directory service; the cabin resource request service module is used to receive the resource request from the cabins; and the cabin resource request or revocation module is used to request and revoke resources based on requests of the cabin generation and management system.

In an embodiment, the cross-domain cabin computing system includes a cabin gateway, connected to the cabin generation and management system, used to receive and send the cabin-data-and-resource request from the cabin users to the cabin generation and management system.

In an embodiment, the cabin gateway includes a service gateway, an identity authentication module, an application programming interface (API) monitoring module, a flow limitation module, and an intelligent routing module; the service gateway is used to provide an access point for the cabin data and resource request; the identity authentication module is used to realize registration, management and identity authentication of users; the API monitoring module is used to monitor external API services; the flow limitation module is used to limit traffic of service access; and the intelligent routing module, used to route the service access.

In an embodiment, the cross-domain cabin computing system includes a virtual data center gateway, connected to the cabin generation and management system and the virtual data center system, used to send the data resource map request from the cabin generation and management system to the virtual data center system.

In an embodiment, the cross-domain cabin computing system includes a cross-domain resource gateway, connected to the cabin generation and management system and the cross-domain resource management system, used to send the cross-domain resource directory request from the cabin generation and management system to the cross-domain resource management system.

In an embodiment, the cabin generation and management system is further used to request resources directly from resource providers based on the list of resource requirements to enable the cabin users to establish the cabins based on the cross-domain resources and the data resources corresponding to the data resource distribution map, thereby implementing the cabin computing.

In an embodiment, when closing the cabins, the cabin generation and management system is used to send a cabin resource revocation request to the cross-domain resource management system; the cross-domain resource management system is also used to return all the resources requested by the cabins to corresponding resource providers based on the cabin resource revocation request, and feedback information signaling that the cabin resource revocation request is successful to the cabin generation and management system.

The present disclosure also provides a cross-domain cabin computing method based on data resource distribution, including: constructing a virtual data center system, wherein the virtual data center system is used to provide a data resource distribution map; constructing a cross-domain resource management system, wherein the cross-domain resource management system is used to provide a cross-domain resource directory; sending, by a cabin generation and management system, a request for the data resource distribution map to the virtual data center system and sending a request for the cross-domain resource directory to the cross-domain resource management system based on a cabin-data-and-resource request sent by cabin users, calculating a list of resource requirements for cabins based on the data resource distribution map provided by the virtual data center system and the cross-domain resource directory provided by the cross-domain resource management system; and sending, by a cross-domain resource management system, a resource request to a public cloud or a non-cloud resource to which resources belong, based on the list of resource requirements of the cabins, and sending information signaling that the resource request is successful to the cabin generation and management system to enable the cabin users to establish cabins based on cross-domain resources and data resources corresponding to the data resource distribution map, thereby realizing cabin computing.

In an embodiment, the method further includes: the cabin generation and management system closes the cabins based on a closing request from the cabin users after the cabin computing is completed.

In an embodiment, the method further includes: the cabin generation and management system sends a cabin resource revocation request to the cross-domain resource management system when closing the cabins, the cross-domain resource management system returns all the resources requested by the cabins to a respective resource provider based on the cabin resource revocation request, and feeds back information signaling that the cabin resource revocation request is successful to the cabin generation and management system.

In an embodiment, a cabin gateway sends the cabin-data-and-resource request from the cabin users to the cabin generation and management system.

In an embodiment, a virtual data center gateway sends the request for the data resource distribution map of the cabin generation and management system to the virtual data center system.

In an embodiment, a cross-domain resource gateway sends a request for a cross-domain resource directory of the cabin generation and management system to the cross-domain resource management system.

In an embodiment, the cabin generation and management system requests resources directly from resource providers based on the list of resource requirements to enable the cabin users to establish the cabins based on the cross-domain resources and the data resources corresponding to the data resource distribution map, thereby implementing the cabin computing.

As described above, the cross-domain cabin computing system and the cross-domain cabin computing method based on data resource distribution have the following beneficial effects:

(1) Using cabins, Internet resources are flexibly combined to build a computing environment in an optimal way, thereby achieving proximity computing, and solving the problem of low resource utilization on the Internet.

(2) Through the exploration function of the virtual data center, a descriptive model is established for the data of the Internet and a data resource distribution map is generated; the cross-domain resource management system generates a resource distribution map, so that when users have computing demands, the optimal list of resource requests can be calculated through the cabin generation and management system as long as two virtual views are acquired, thereby forming an optimal temporary computing environment.

(3) The three subsystems, including the virtual data center system, the cross-domain resource management system, and the cabin generation and management system, are coordinated vertically, so as to make it possible to move, customize, revoke, combine, and build the cabins, with mobility, scalability, and specialization, thereby realizing specialization, systematization and automation.

DETAILED DESCRIPTION

The embodiments of the present disclosure will be described below through specific examples. One skilled in the art can easily understand other advantages and effects of the present disclosure according to contents disclosed in the description. The present disclosure may also be implemented or applied through other different embodiments, and various modifications or changes may be made to all details in the description based on different points of view and applications without departing from the spirit of the present disclosure. It should be noted that the embodiments of the present disclosure and the features of the present disclosure can be combined with each other without conflict.

It should be noted that, the drawings provided in this embodiment only exemplify the basic idea of the present disclosure. Although only the components related to the present disclosure are shown in the drawings, they are not necessarily drawn according to the quantities, shapes, and sizes of the components during actual implementation. During actual implementation, the patterns, quantities, and proportions of the components may be changed as needed, and the layout of the components may be more complicated.

A cross-domain cabin computing system and a cross-domain cabin computing method based on data resource distribution of the present disclosure are able to generate a task computing environment with dedicated customization, cross-domain scaling, and autonomous system operation and maintenance for dynamic tasks through cabin computing, and solves the problem of dynamic and optimal resource allocation in dynamic task scenarios. Among them, cabin computing is the cross-domain resource configuration and collaborative computing integration environment for the full life of IT (Internet Technology) tasks accessed through the Internet. The core idea of cabin computing is "mobile special cabins, flexible cross-domain resource, and autonomous system operation and maintenance".

Innovation points of the cabins include:

(1) mobile building by the need of IT tasks, scalable management by the execution of IT tasks, and dynamic extinction by the end of IT tasks.

(2) From the vertical dimension of the full life of IT tasks, the cabins accomplishes the four functions of identifying requirements, allocating resources, executing tasks, and ending tasks.

(3) From the horizontal dimension of resources required for IT tasks, the integrated configuration and coordinated operation of data resources and physical resources are realized.

Figure 1:
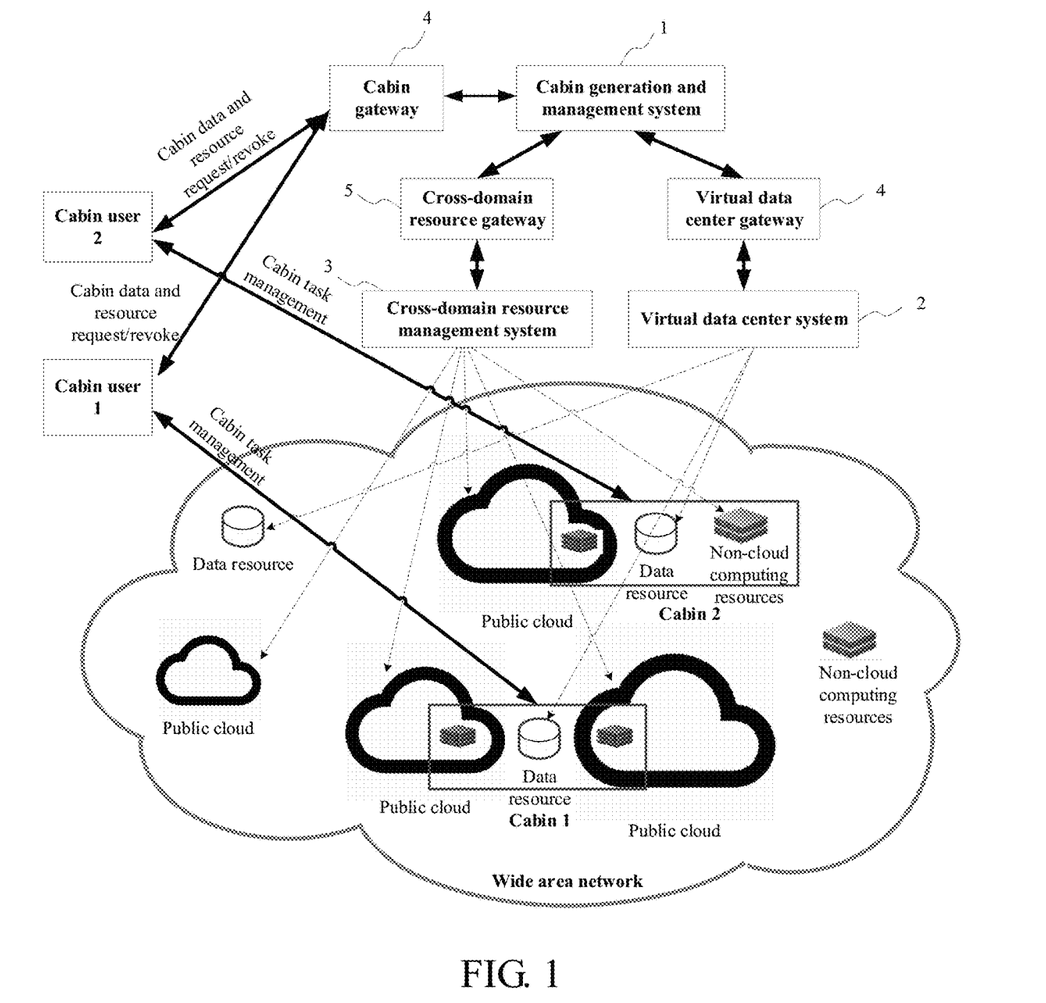
FIG. 1 is a structural diagram of a cross-domain cabin computing system based on data resource distribution according to an embodiment of the present disclosure.

In an embodiment, as shown in FIG. 1, the cross-domain cabin computing system based on data resource distribution of the present disclosure includes a cabin generation and management system 1, a virtual data center system 2, and a cross-domain resource management system 3.

The cabin generation and management system 1 is used to send a request for a data resource distribution map to the virtual data center system 2 and is used to send a request for a cross-domain resource directory to the cross-domain resource management system 3 based on a cabin-data-and-resource request sent by cabin users, and is used to calculate a list of resource requirements for cabins based on a data resource distribution map provided by the virtual data center system 2 and a cross-domain resource directory provided by the cross-domain resource management system 3. In the process of building the cabins, two key data, namely resource distribution and data distribution, are required in order to calculate the optimal combination of resources. Therefore, the cabin generation and management system 1 calculates the list of resource requirements based on the data resource distribution map corresponding to the cabin-data-and-resource request and the cross-domain resource directory to achieve proximity calculation and optimal resource utilization.

Figure 2:
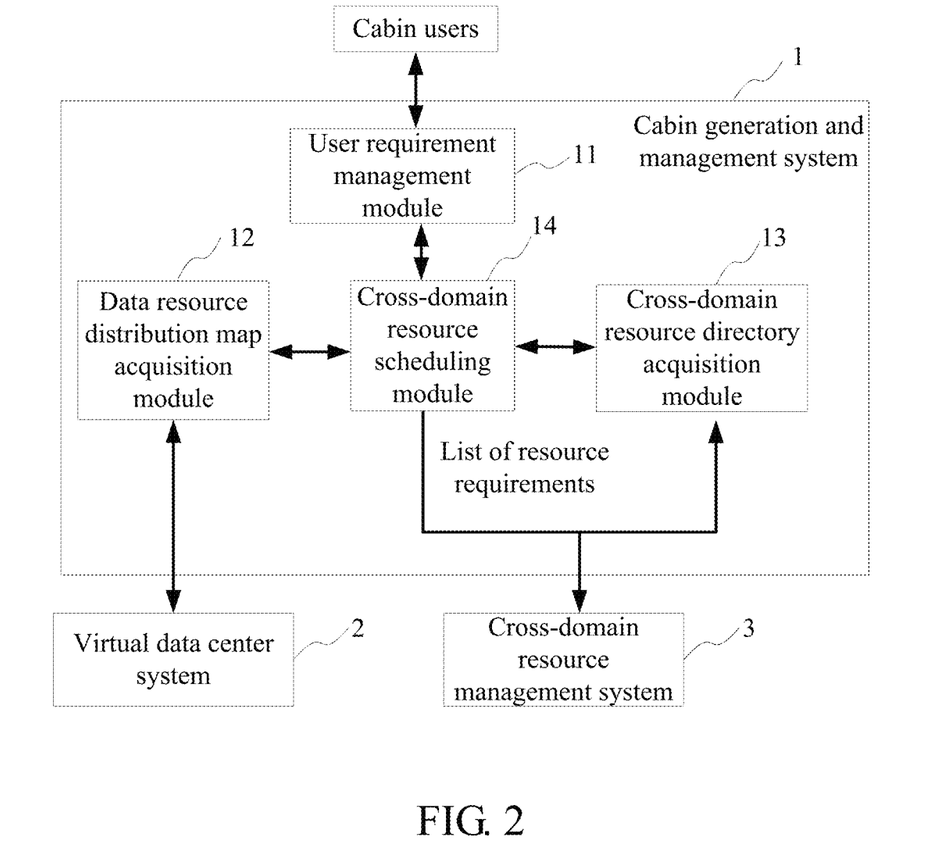
FIG. 2 is a structural diagram of a cabin generation and management system according to an embodiment of the present disclosure.

In an embodiment, as shown in FIG. 2, the cabin generation and management system 1 includes a user requirement management module 11, a data resource distribution map acquisition module 12, a cross-domain resource directory acquisition module 13, and a cross-domain resource scheduling module 14. The user requirement management module 11 is used to receive the cabin-data-and-resource request sent by the cabin users. The data resource distribution map acquisition module 12 is connected to the virtual data center system 2, is used to access the virtual data center system, and is used to obtain the data resource distribution map based on the cabin data and resource request. The cross-domain resource directory acquisition module 13 is connected to the cross-domain resource management system 3, and is used to access the cross-domain resource management system 3 to obtain the cross-domain resource directory. The cross-domain resource scheduling module 14 is connected to the user requirement management module 11, the data resource distribution map acquisition module 12, the cross-domain resource directory acquisition module 13, and the cross-domain resource management system 3, and is used to calculate the list of resource requirements based on the cabin data and resource request, the data resource distribution map and the cross-domain resource directory, and send the list of resource requirements to the cross-domain resource management system 3.

The virtual data center system 2 is connected to the cabin generation and management system 1, and is used to provide the data resource distribution map based on the data resource distribution map request. In an embodiment, the virtual data center system 2 is an independent public service system operating 24 hours a day, seven days a week. The data sources of the virtual data center system 2 mainly include: (1) open Internet data; (2) protocol data providers.

Figure 3:
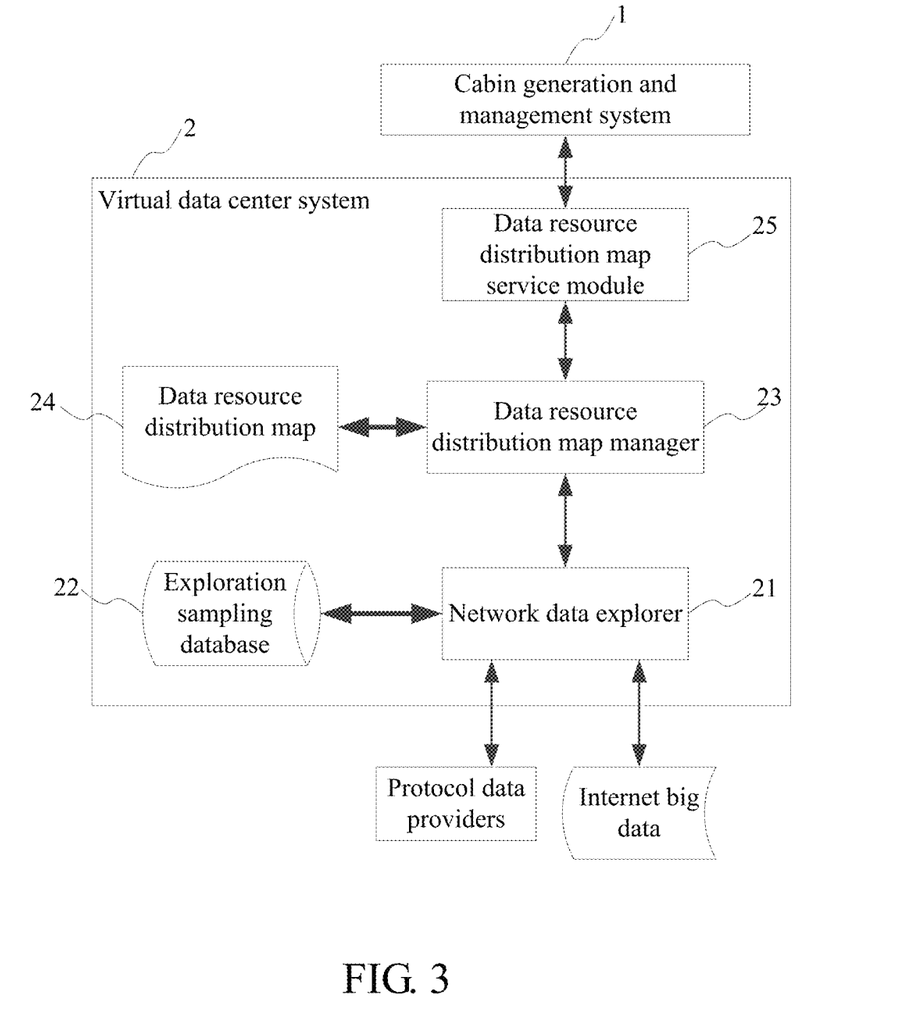
FIG. 3 is a structural diagram of a virtual data center system according to an embodiment of the present disclosure.

In an embodiment, as shown in FIG. 3, the virtual data center system 2 includes a network data explorer 21, an exploration sampling database 22, a data resource distribution map manager 23, a data resource distribution map 24, and a data resource distribution map service module 25. The network data explorer 21 is connected to the exploration sampling database 22, and is used to explore network big data and data from protocol data providers to generate the data resource distribution map, and is used to place exploration samples into the exploration sampling database 22. The network data explorer 21 uses an exploration algorithm to explore the two data resources and generates the data resource distribution map. The data resource distribution map mainly describes the characteristics of geographic location of data resources, the type of data resources, the update speed of data resources, the volume of the data resources, etc. The exploration sampling database 22 is used to save the exploration samples obtained by the network data explorer 21. The data resource distribution map 24 is used to save distribution information of data resources. That is, the data resource distribution map 24 saves the description of the data resources and the geographic location information of the data resources. The data resource distribution map manager 23 is connected to the data resource distribution map 24, and is used to maintain the data resource distribution map data and implement operations such as adding, deleting, modifying and searching for the data resource distribution map 24. The data resource distribution map service module 25 is connected to the data resource distribution map manager 23 and the cabin generation and management system 1, and is used to provide access service for the data resource distribution map data, e.g., providing the data resource distribution map for the cabin generation and management system 1.

The cross-domain resource management system 3 is connected to the cabin generation and management system 1, and is used to send a resource request to a public cloud or a non-cloud resource to which resources belong based on the list of resource requirements of the cabins, and send information signaling that the resource request is successful to the cabin generation and management system 1 to enable the cabin users to establish the cabins based on cross-domain resources and data resources corresponding to the data resource distribution map, thereby realizing cabin computing.

In an embodiment, the cross-domain resource management system 3 is an independent public service system operating 24 hours a day, seven days a week, which provides a resource registration service. Any IT resource on the Internet can be registered through the registration system. The registration service requires the resource providers to provide information about the geographic location of the resources, the description of the resources, the interface for how to obtain the resources, the usage fee of the resources, and the interface for querying resource status in real time. After the Internet resources are registered, a resource directory will be formed, which can be updated regularly.

Figure 4:
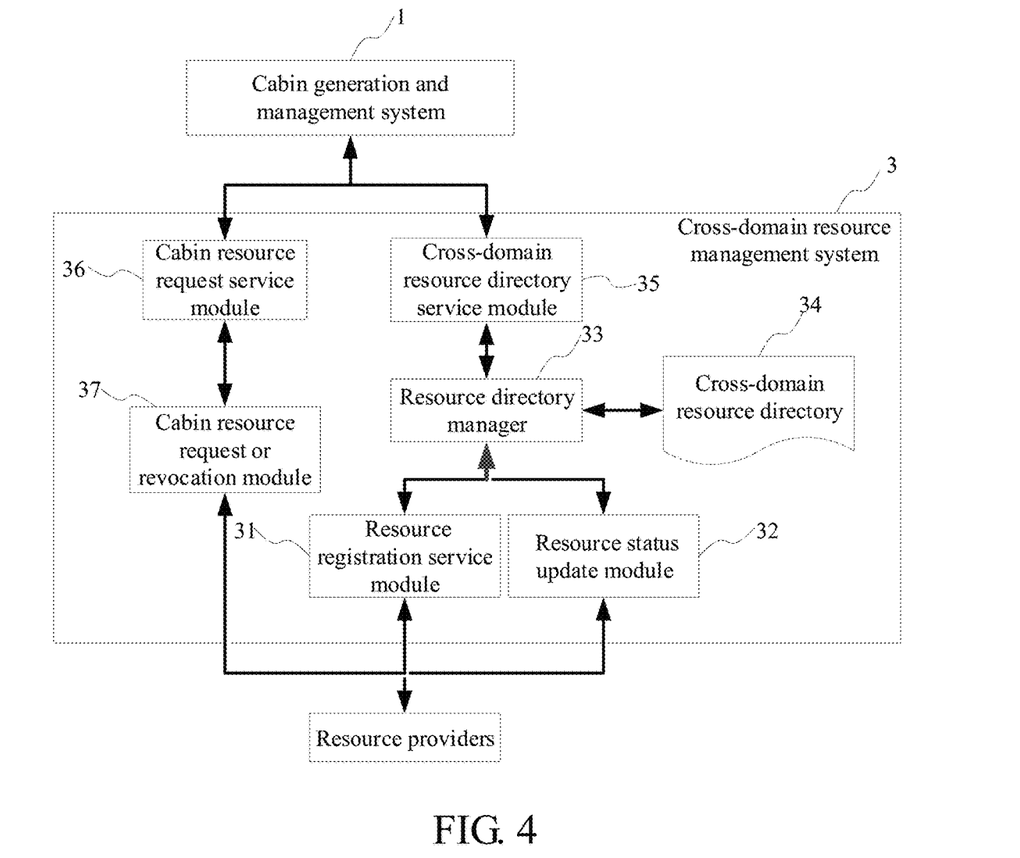
FIG. 4 is a structural diagram of a cross-domain resource management system according to an embodiment of the present disclosure.

In an embodiment, as shown in FIG. 4, the cross-domain resource management system 3 further includes a resource registration service module 31, a resource status update module 32, a resource directory manager 33, a cross-domain resource directory 34, a cross-domain resource directory service module 35, a cabin resource request service module 36, and a cabin resource request or revocation module 37. The resource registration service module 31 is used to provide a resource registration service for external resource providers. The resource status update module 32 is used to update the resource status of the external resource providers. The cross-domain resource directory 34 is used to store a list of cross-domain resources. The resource directory manager 33 is connected to the resource registration service module 31, the resource status update module 32, and the cross-domain resource directory 34, and is used to manage the cross-domain resource directory, and implement operations such as adding, deleting, modifying and searching for the data of the cross-domain resource directory. The cross-domain resource directory service module 35 is connected to the resource directory manager 33 and the cabin generation and management system 1, and is used to provide a resource directory service. The cabin resource request service module 36 is connected to the cabin generation and management system 1, and is used to receive the resource request from the cabin generation and management system 1. The cabin resource request or revocation module 37 is connected to the cabin resource request service module 36 and the resource status update module 32, is used to request or revoke resources based on requests of the cabin generation and management system 1, and is used to update the resource status of the resource status update module 32. In an embodiment, after receiving the list of resource requests of the cabin generation and management system 1, the cabin resource request or revocation module 37 uses a corresponding resource application interface to apply to the resource providers for resources according to the requirements in the list of resource requests. When the resource application is successful, the cross-domain resource directory 34 will be updated, and the successful application will be returned to the resource applicant at the same time; resources are then revoked according to the revoke request of the cabin generation and management system 1.

Figure 5:
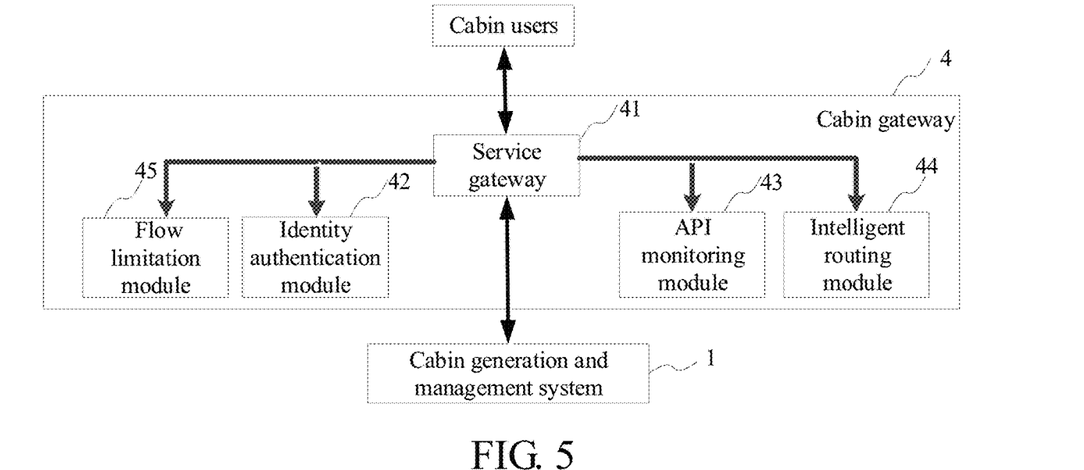
FIG. 5 is a structural diagram of a cabin gateway according to an embodiment of the present disclosure.

In an embodiment, as shown in FIG. 1, the cross-domain cabin computing system based on data resource distribution further includes a cabin gateway 4. The cabin gateway 4 is connected to the cabin generation and management system 1, and is used to receive and send the cabin-data-and-resource request from the cabin users to the cabin generation and management system 1. As shown in FIG. 5, the cabin gateway 4 includes a service gateway 41, an identity authentication module 42, an API monitoring module 43, an intelligent routing module 44, and a flow limitation module 45. The service gateway 41 is connected to the cabin generation and management system 1, and is used to provide a unified access point for the cabin data and resource request. The identity authentication module 42 is connected to the service gateway 41, and is used to realize registration, management and identity authentication of users. The API monitoring module 43 is connected to the service gateway 41, and is used to monitor external API services. The flow limitation module 45 is connected to the service gateway 41, and is used to limit traffic of service access. The intelligent routing module 44 is connected to the service gateway 41, and is used to route the service access.

Figure 6:
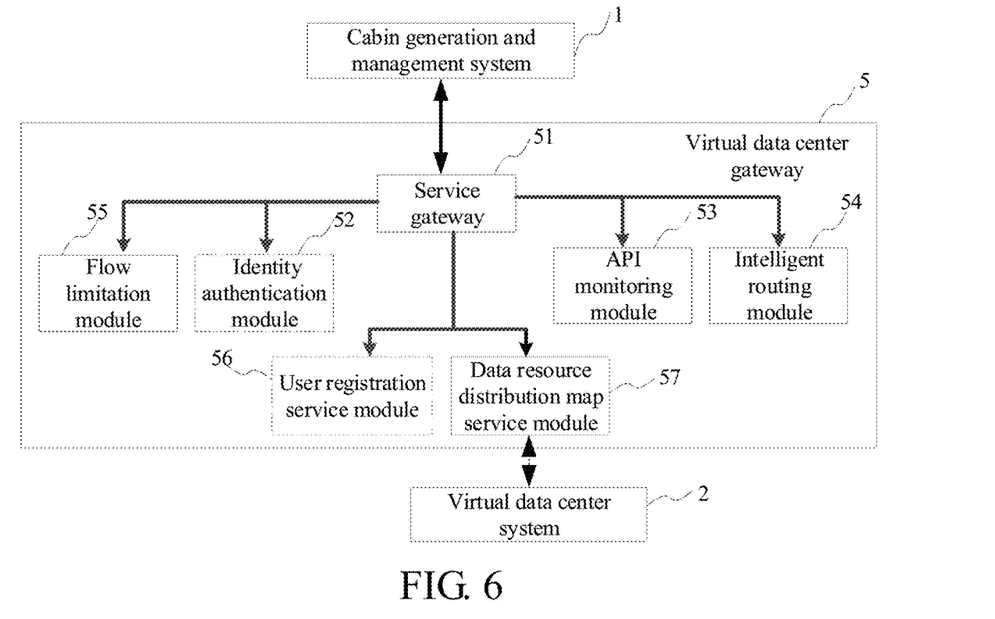
FIG. 6 is a structural diagram of a virtual data center gateway according to an embodiment of the present disclosure.

In an embodiment, as shown in FIG. 1, the cross-domain cabin computing system based on data resource distribution further includes a virtual data center gateway 5. The virtual data center gateway 5 is connected to the cabin generation and management system 1 and the virtual data center system 2, and is used to send the data resource map request from the cabin generation and management system 1 to the virtual data center system 2. In an embodiment, as shown in FIG. 6, the virtual data center gateway 5 includes a service gateway 51, an identity authentication module 52, an application programming interface (API) monitoring module 53, an intelligent routing module 54, a flow limitation module 55, a user registration service module 56 and a data resource distribution map service module 57. The service gateway 51 is connected to the cabin generation and management system 1, and is used to provide a unified access point for the data resource distribution map request. The identity authentication module 52 is optionally set to be connected to the service gateway 51, and is used to implement identity authentication of the users. The API monitoring module 53 is connected to the service gateway 51, and is used to monitor external API services. The flow limitation module 55 is connected to the service gateway 51, and is used to limit traffic of a service access. The intelligent routing module 54 is connected to the service gateway 51, and is used to route the service access. The user registration service module 56 is optionally set to be connected to the service gateway 51, and is used to implement registration service of users. The data resource distribution map service module 57 is connected to the service gateway 51 and the virtual data center system 2, and is used to provide a request service of the data resource distribution map.

Figure 7:
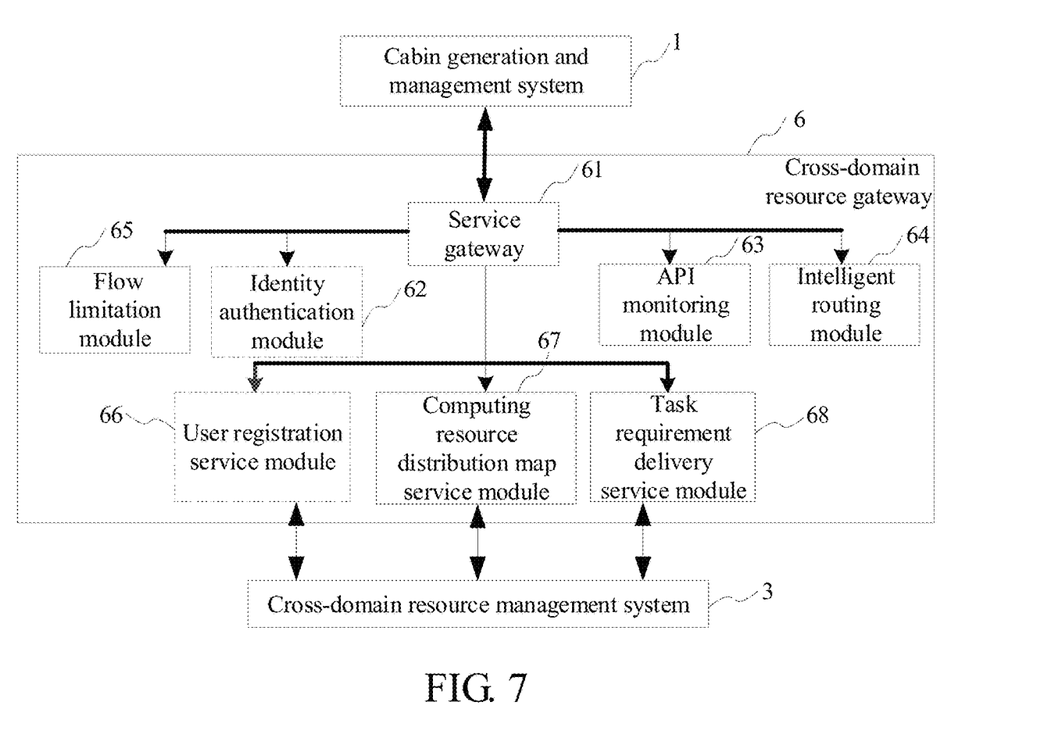
FIG. 7 is a structural diagram of a cross-domain resource management gateway according to an embodiment of the present disclosure.

In an embodiment, as shown in FIG. 1, the cross-domain cabin computing system based on data resource distribution further includes a cross-domain resource gateway 6. The cross-domain resource gateway 6 is connected to the cabin generation and management system 1 and the cross-domain resource management system 3, and is used to send the cross-domain resource directory request from the cabin generation and management system 1 to the cross-domain resource management system 3. In an embodiment, as shown in FIG. 7, the cross-domain resource gateway 6 includes a service gateway 61, an identity authentication module 62, an API monitoring module 63, an intelligent routing module 64, a flow limitation module 65, a user registration service module 66, a computing resource distribution map service module 67, and a task requirement delivery service module 68. The service gateway 61 is connected to the cabin generation and management system 1, and is used to provide a unified access point for the cross-domain resource directory request. The identity authentication module 62 is optionally set to be connected to the service gateway 61, and is used to implement identity authentication of the users. The API monitoring module 63 is connected to the service gateway 61, and is used to monitor external API services. The flow limitation module 65 is connected to the service gateway 61, and is used to limit traffic of a service access. The intelligent routing module 64 is connected to the service gateway 61, and is used to route the service access. The user registration service module 66 is optionally set to be connected to the service gateway 61 and the cross-domain resource management system 3, and is used to implement the registration service of the users. The computing resource distribution map service module 67 is connected to the service gateway 61 and the cross-domain resource management system 3, and is used to provide a request service of the cross-domain resource directory. The task requirement delivery service module 68 is connected to the service gateway 61 and the cross-domain resource management system 3, and is used to provide a task request submission service.

In an embodiment, when the cabin computing is completed, the cabins need to be closed. The cabin generation and management system 1 is used to send a cabin resource revocation request to the cross-domain resource management system 3. The cross-domain resource management system 3 is also used to return all the resources requested by the cabins to corresponding resource providers based on the cabin resource revocation request, and feedback information signaling that the cabin resource revocation request is successful to the cabin generation and management system 1. Besides, the returned resources can be reapplied to other cabin computing, thus maximizing resource utilization.

Figure 8:
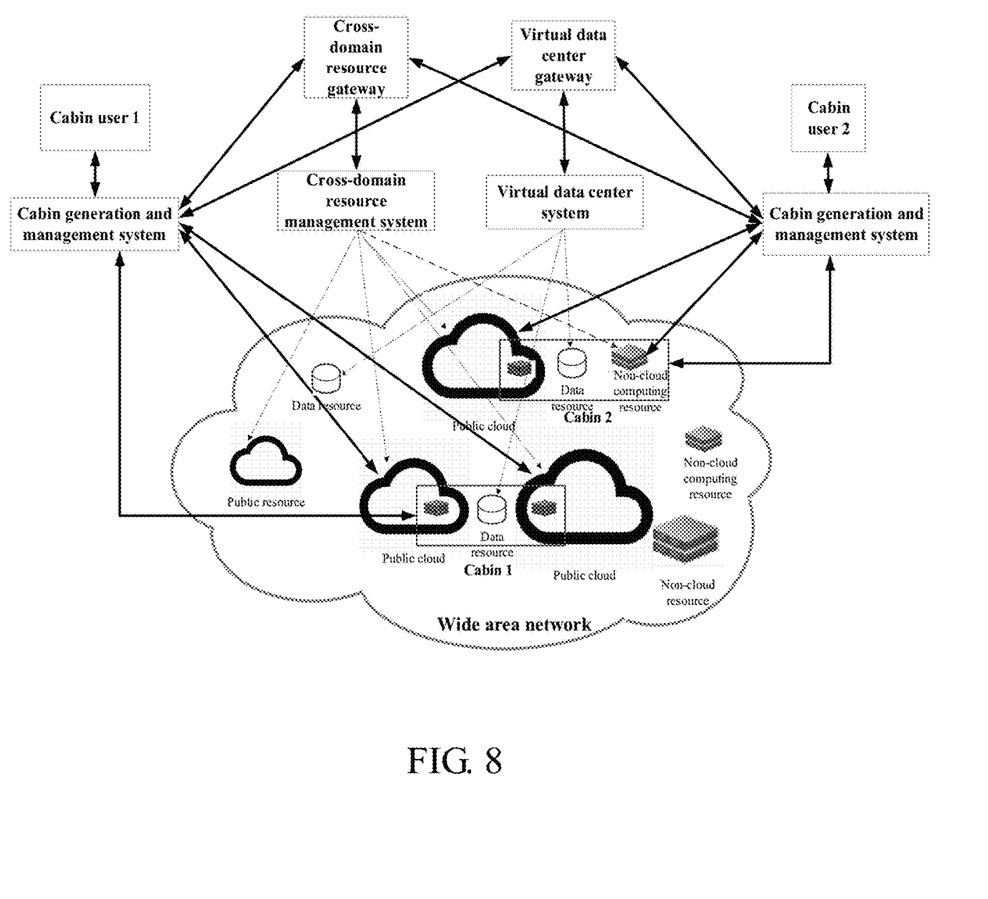
FIG. 8 is a structural diagram of a cross-domain cabin computing system based on data resource distribution according to an embodiment of the present disclosure.

As shown in FIG. 8, the cross-domain cabin computing system based on data resource distribution of the present disclosure can also support an autonomous deployment mode. In this working mode, when a user has a computational task, a cabin generation and management system can be installed locally. After a computation request is submitted by the cabin generation and management system, the cabin generation and management system will actively access the cross-domain resource management system and the virtual data center system to obtain the resource distribution map and the data distribution map. At the same time, the cabin generation and management system will also generate the list of cabin resources based on the user requirements, the resource distribution map, and the data distribution map. The user can request resources directly from the resource providers on the Internet instead of the cross-domain resource management system, to enable the cabin users to build the cabins based on the acquired cross-domain resources and the data resources corresponding to the data resource distribution map, thereby realizing cabin computing.

Figure 9:
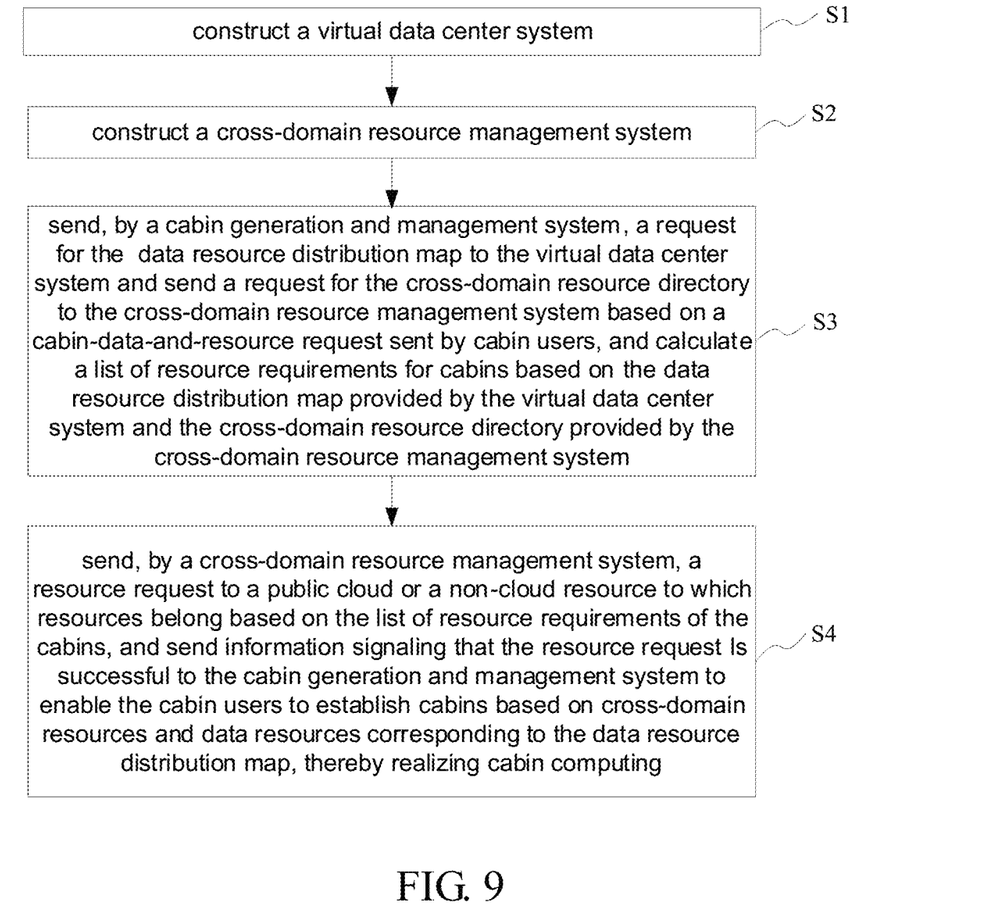
FIG. 9 is a structural diagram of a cross-domain cabin computing method based on data resource distribution according to an embodiment of the present disclosure.

In an embodiment, as shown in FIG. 9, the cross-domain cabin computing method based on data resource distribution includes the following steps:

Step S1, constructing a virtual data center system. The virtual data center system is used to provide a data resource distribution map.

In an embodiment, the virtual data center system generates and saves the data resource distribution map, and provides an inquiry service of the data resource distribution map.

Step S2, constructing a cross-domain resource management system. The cross-domain resource management system is used to provide a cross-domain resource directory.

In an embodiment, the cross-domain resource management system stores the cross-domain resource directory provided by resource providers and provides a query service of the cross-domain resource directory. The cross-domain resource directory can be updated in real time according to the usage status of the resources.

Step S3, sending, by a cabin generation and management system, a request for the data resource distribution map to the virtual data center system and sending a request for the cross-domain resource directory to the cross-domain resource management system based on a cabin-data-and-resource request sent by cabin users, calculating a list of resource requirements for cabins based on the data resource distribution map provided by the virtual data center system and the cross-domain resource directory provided by the cross-domain resource management system.

In an embodiment, when the cabin user have a computing task, the cabin user logs into the cabin generation and management system, and submits task requirements after passing identity authentication. The requirements are divided into the following two categories: one is the information related to the calculation task and constraints, including the calculation task volume, the data transfer and the calculation processing condition constraints, price constraints, etc.; the other is the information of calculation data requirements (data type, keywords of data contents, requirements of the data volume, etc.). After receiving the information of the task requirements submitted by the user, the cabin generation and management system requests the cross-domain resource directory from the cross-domain resource management system and requests the data resource distribution map from the virtual data center system. Then, based on the task requirements submitted by the user, the cabin generation and management system combines the cross-domain resource directory and the data resource distribution map to optimize the resource allocation, generates the list of resource requirements of the cabins, and submits the list of the resource requirements to the cross-domain resource management system.

Step S4, sending, by a cross-domain resource management system, a resource request to a public cloud or a non-cloud resource to which resources belong based on the list of resource requirements of the cabins, and sending information signaling that the resource request is successful to the cabin generation and management system to enable the cabin users to establish cabins based on cross-domain resources and data resources corresponding to the data resource distribution map, thereby realizing cabin computing.

In an embodiment, based on the received resource request list, the cabin resource request service module of the cross-domain resource management system sends a resource request to the public cloud or the non-cloud computing resource to which the resources belong through the cabin resource request or revocation module. When all resource requests are completed, the cross-domain resource management system returns information signaling the completion of the resource request of the cabins to the cabin generation and management system, including the Internet Protocol (IP) address of the servers where the cabins are located, etc. After the cabin generation and management system receives the information that all the resources have been acquired, the cabin users can log in the requested resources to build the cabin computing environment, deploy computing tasks, and also access the data resources corresponding to the data resource distribution map.

In an embodiment, when the cabin computing is completed, the cabin generation and management system closes the cabins based on a closing request from the cabin users. When closing the cabins, the cabin generation and management system sends a cabin resource revocation request to the cross-domain resource management system. The cross-domain resource management system returns all the resources requested by the cabins to corresponding resource providers based on the cabin resource revocation request, and feedbacks information signaling that the cabin resource revocation request is successful to the cabin generation and management system.

In an embodiment, the cross-domain cabin computing method based on data resource distribution includes: sending the cabin-data-and-resource request from the cabin users to the cabin generation and management system; sending, by a virtual data center gateway, the data resource distribution map request of the cabin generation and management system to the virtual data center system; sending, by a cross-domain resource gateway, a request for a cross-domain resource directory of the cabin generation and management system to the cross-domain resource management system.

In an embodiment, the cross-domain cabin computing method based on data resource distribution includes: requesting, by the cabin generation and management system, resources directly from resource providers based on the list of resource requirements to enable the cabin users to establish the cabins based on the cross-domain resources and the data resources corresponding to the data resource distribution map, thereby implementing the cabin computing.

As described above, the cross-domain cabin computing system and the cross-domain cabin computing method based on data resource distribution use the idea of cabins, and Internet resources are flexibly combined to build a computing environment in an optimal way, thereby achieving proximity computing, and solving the problem of low resource utilization on the Internet. Through the exploration function of the virtual data center, a descriptive model is established for the data of the Internet and a data resource distribution map is generated; the cross-domain resource management system generates a resource distribution map, so that when users generate computing demands, the optimal list of resource requests can be calculated through the cabin generation and management system as long as two virtual views are acquired, thus forming an optimal temporary computing environment. The three subsystems, including the virtual data center system, the cross-domain resource management system, and the cabin generation and management system, are coordinated vertically, so as to make it possible to move, customize, revoke, combine, and build the cabins, with mobility, scalability, and specialization, thereby realizing specialization, systematization and automation. Therefore, this application has a high industrial utilization value.

The foregoing embodiments only describe several implementations of the present disclosure, and their description is specific and detailed, but cannot therefore be understood as a limitation to the patent scope of the present disclosure. It should be noted that, a person of ordinary skill in the art may further make several variations and improvements without departing from the concept of the present disclosure, which shall fall within the protection scope of the present disclosure. Therefore, the protection scope of the present disclosure shall be subject to the appended claims.

What is claimed is:

1. A cross-domain cabin computing system based on data resource distribution, comprising:
   a processor; and
   a memory storing computer programs, wherein the computer programs are executed by the processor to implement:
   a cabin generation and management system;
   a virtual data center system; and
   a cross-domain resource management system;
   wherein when cabin users have a computing task, the cabin generation and management system sends a request for a data resource distribution map to the virtual data center system and sends a request for a cross-domain resource directory to the cross-domain resource management system based on a cabin-data-and-resource request sent by the cabin users, and calculates a list of resource requirements for cabins based on the data resource distribution map provided by the virtual data center system and the cross-domain resource directory provided by the cross-domain resource management system;
   wherein the virtual data center system is connected to the cabin generation and management system, and is used to provide the data resource distribution map based on the request for the data resource distribution map;
   wherein the cross-domain resource management system is connected to the cabin generation and management system, and is used to send a resource request to a public cloud or a non-cloud resource to which resources belong, based on the list of resource requirements of the cabins, and send information signaling that the resource request is successful to the cabin generation and management system to enable the cabin users to establish the cabins, wherein the cabins comprise cross-domain resources and data resources corresponding to the data resource distribution map, thereby realizing cabin computing; wherein the cabins are temporary computing environments corresponding to said computing task;
   wherein the cabin generation and management system is disposed at a user side, and the virtual data center system and the cross-domain resource management system are disposed at a system side;

wherein the data resource distribution map comprises a geographic location of the data resources, a type of the data resources, an update speed of the data resources, and a volume of the data resources; wherein the cross-domain resource directory comprises a geographic location of the cross-domain resources, a description of the domain resources, an interface for how to obtain the domain resources, a usage fee of the domain resources, and an interface for querying resource status in real time.

2. The cross-domain cabin computing system based on data resource distribution according to claim 1, wherein the cabin generation and management system comprises a user requirement management module, a data resource distribution map acquisition module, a cross-domain resource directory acquisition module, and a cross-domain resource scheduling module; the user requirement management module is used to receive the cabin data and resource request; the data resource distribution map acquisition module is used to access the virtual data center system, and is used to obtain the data resource distribution map based on the cabin data and resource request; the cross-domain resource directory acquisition module is used to access the cross-domain resource management system to obtain the cross-domain resource directory; and the cross-domain resource scheduling module is used to calculate the list of resource requirements based on the cabin data and resource request, the data resource distribution map and the cross-domain resource directory.

3. The cross-domain cabin computing system based on data resource distribution according to claim 1, wherein the virtual data center system comprises a network data explorer, an exploration sampling database, a data resource distribution map manager, a data resource distribution map, and a data resource distribution map service module; the network data explorer is used to explore network big data and data from protocol data providers to generate the data resource distribution map, and is used to place exploration samples into the exploration sampling database; the exploration sampling database is used to save the exploration samples obtained by the network data explorer; the data resource distribution map manager is used to maintain data of the data resource distribution map; the data resource distribution map is used to save distribution information of data resources; and the data resource distribution map service module is used to provide an access service for the data resource distribution map data.

4. The cross-domain cabin computing system based on data resource distribution according to claim 1, wherein the cross-domain resource management system comprises a resource registration service module, a resource status update module, a resource directory manager, a cross-domain resource directory, a cross-domain resource directory service module, a cabin resource request service module, and a cabin resource request or revocation module; the resource registration service module is used to provide a resource registration service for external resource providers; the resource status update module is used to update resource status of the external resource providers; the resource directory manager is used to manage the cross-domain resource directory; the cross-domain resource directory is used to store a list of cross-domain resources; the cross-domain resource directory service module is used to provide a resource directory service; a cabin resource request service module is used to receive the resource request from the cabins; and the cabin resource request or revocation module is used to request and revoke resources based on requests of the cabin generation and management system.

5. The cross-domain cabin computing system based on data resource distribution according to claim 1, further comprising:
a cabin gateway, connected to the cabin generation and management system, used to receive and send the cabin-data-and-resource-request from the cabin users to the cabin generation and management system.

6. The cross-domain cabin computing system based on data resource distribution according to claim 5, wherein the cabin gateway comprises a service gateway, an identity authentication module, an application programming interface (API) monitoring module, a flow limitation module, and an intelligent routing module; the service gateway is used to provide an access point for the cabin data and resource request; the identity authentication module is used to realize registration, management and identity authentication of users; the API monitoring module is used to monitor external API services; the flow limitation module is used to limit traffic of service access; and the intelligent routing module is used to route the service access.

7. The cross-domain cabin computing system based on data resource distribution according to claim 1, further comprising:
a virtual data center gateway, connected to the cabin generation and management system and the virtual data center system, used to send the request for the data resource map from the cabin generation and management system to the virtual data center system.

8. The cross-domain cabin computing system based on data resource distribution according to claim 1, wherein further comprising:
a cross-domain resource gateway, connected to the cabin generation and management system and the cross-domain resource management system, used to send the request for the cross-domain resource directory from the cabin generation and management system to the cross-domain resource management system.

9. The cross-domain cabin computing system based on data resource distribution according to claim 1, wherein the cabin generation and management system is further used to request resources directly from resource providers based on the list of resource requirements to enable the cabin users to establish the cabins based on the cross-domain resources and the data resources corresponding to the data resource distribution map, thereby implementing the cabin computing.

10. The cross-domain cabin computing system based on data resource distribution according to claim 1, wherein when closing the cabins, the cabin generation and management system is used to send a cabin resource revocation request to the cross-domain resource management system; the cross-domain resource management system is also used to return all the resources requested by the cabins to corresponding resource providers based on the cabin resource revocation request, and feedback information signaling that the cabin resource revocation request is successful to the cabin generation and management system.

11. The cross-domain cabin computing system based on data resource distribution according to claim 1, wherein the cabin-data-and-resource request comprises two types of information, one type of information is related to the task requirements, and the other type of information is related to data requirements.

12. The cross-domain cabin computing system based on data resource distribution according to claim 1, further comprising a virtual data center gateway and a cross-domain resource gateway; wherein the virtual data center gateway comprises a service gateway, an identity authentication module, an API monitoring module, an intelligent routing module, a flow limitation module, a user registration service module and a data resource distribution map service module; wherein the cross-domain resource gateway comprises a service gateway, an identity authentication module, an API monitoring module, an intelligent routing module, a flow limitation module, a user registration service module, a computing resource distribution map service module, and a task requirement delivery service module.

13. A cross-domain cabin computing method based on data resource distribution, comprising:
   executing, by a processor, computer programs stored in a memory to implement following steps comprising:
   constructing a virtual data center system, wherein the virtual data center system is used to provide a data resource distribution map;
   constructing a cross-domain resource management system, wherein the cross-domain resource management system is used to provide a cross-domain resource directory;
   in response to cabin users having a computing task, sending, by a cabin generation and management system, a request for the data resource distribution map to the virtual data center system and sending a request for the cross-domain resource directory to the cross-domain resource management system based on a cabin-data-and-resource request sent by the cabin users, and calculating a list of resource requirements for cabins based on the data resource distribution map provided by the virtual data center system and the cross-domain resource directory provided by the cross-domain resource management system; and
   sending, by the cross-domain resource management system, a resource request to a public cloud or a non-cloud resource to which resources belong based on the list of resource requirements of the cabins, and sending information signaling that the resource request is successful to the cabin generation and management system to enable the cabin users to establish the cabins, wherein the cabins comprise cross-domain resources and data resources corresponding to the data resource distribution map, thereby realizing cabin computing; wherein the cabins are temporary computing environments corresponding to said computing task;
   wherein the cabin generation and management system is disposed at a user side, and the virtual data center system and the cross-domain resource management system are disposed at a system side;
   wherein the data resource distribution map comprises a geographic location of the data resources, a type of the data resources, an update speed of the data resources, and a volume of the data resources; wherein the cross-domain resource directory comprises a geographic location of the cross-domain resources, a description of the domain resources, an interface for how to obtain the domain resources, a usage fee of the domain resources, and an interface for querying resource status in real time.

14. The cross-domain cabin computing method based on data resource distribution according to claim 13, comprising:
   closing, by the cabin generation and management system, the cabins based on a closing request from the cabin users after the cabin computing is completed.

15. The cross-domain cabin computing method based on data resource distribution according to claim 14, comprising:
   sending, by the cabin generation and management system, a cabin resource revocation request to the cross-domain resource management system when closing the cabins, returning, by the cross-domain resource management system, all the resources requested by the cabins to corresponding resource providers based on the cabin resource revocation request, and feeding back information signaling that the cabin resource revocation request is successful to the cabin generation and management system.

16. The cross-domain cabin computing method based on data resource distribution according to claim 13, comprising:
   sending the cabin-data-and-resource request from the cabin users to the cabin generation and management system.

17. The cross-domain cabin computing method based on data resource distribution according to claim 13, comprising:
   sending, by a virtual data center gateway, the data resource distribution map request of the cabin generation and management system to the virtual data center system.

18. The cross-domain cabin computing method based on data resource distribution according to claim 13, comprising:
   sending, by a cross-domain resource gateway, the request for the cross-domain resource directory of the cabin generation and management system to the cross-domain resource management system.

19. The cross-domain cabin computing method based on data resource distribution according to claim 13, comprising:
   requesting, by the cabin generation and management system, resources directly from resource providers based on the list of resource requirements to enable the cabin users to establish the cabins based on the cross-domain resources and the data resources corresponding to the data resource distribution map, thereby implementing the cabin computing.

* * * * *